Figure 1:
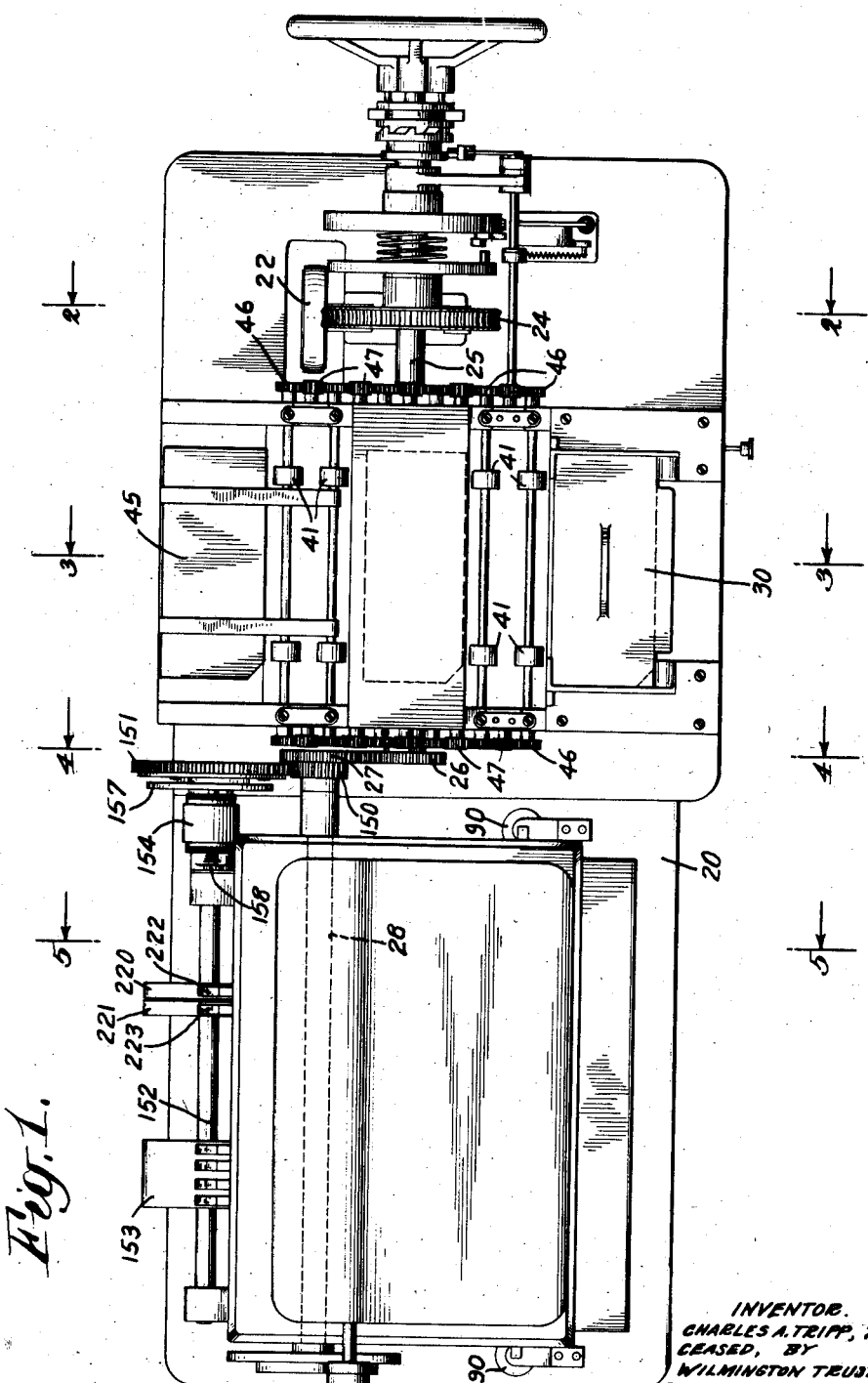

Oct. 30, 1934.  C. A. TRIPP  1,978,919
CARD TABULATING MACHINE
Filed March 28, 1931   9 Sheets-Sheet 1

Oct. 30, 1934.  C. A. TRIPP  1,978,919
CARD TABULATING MACHINE
Filed March 28, 1931   9 Sheets-Sheet 4

INVENTOR.
CHARLES A. TRIPP, DECEASED,
By WILMINGTON TRUST COMPANY &
ELIZABETH W. TRIPP, EXECUTORS.

By Attorney

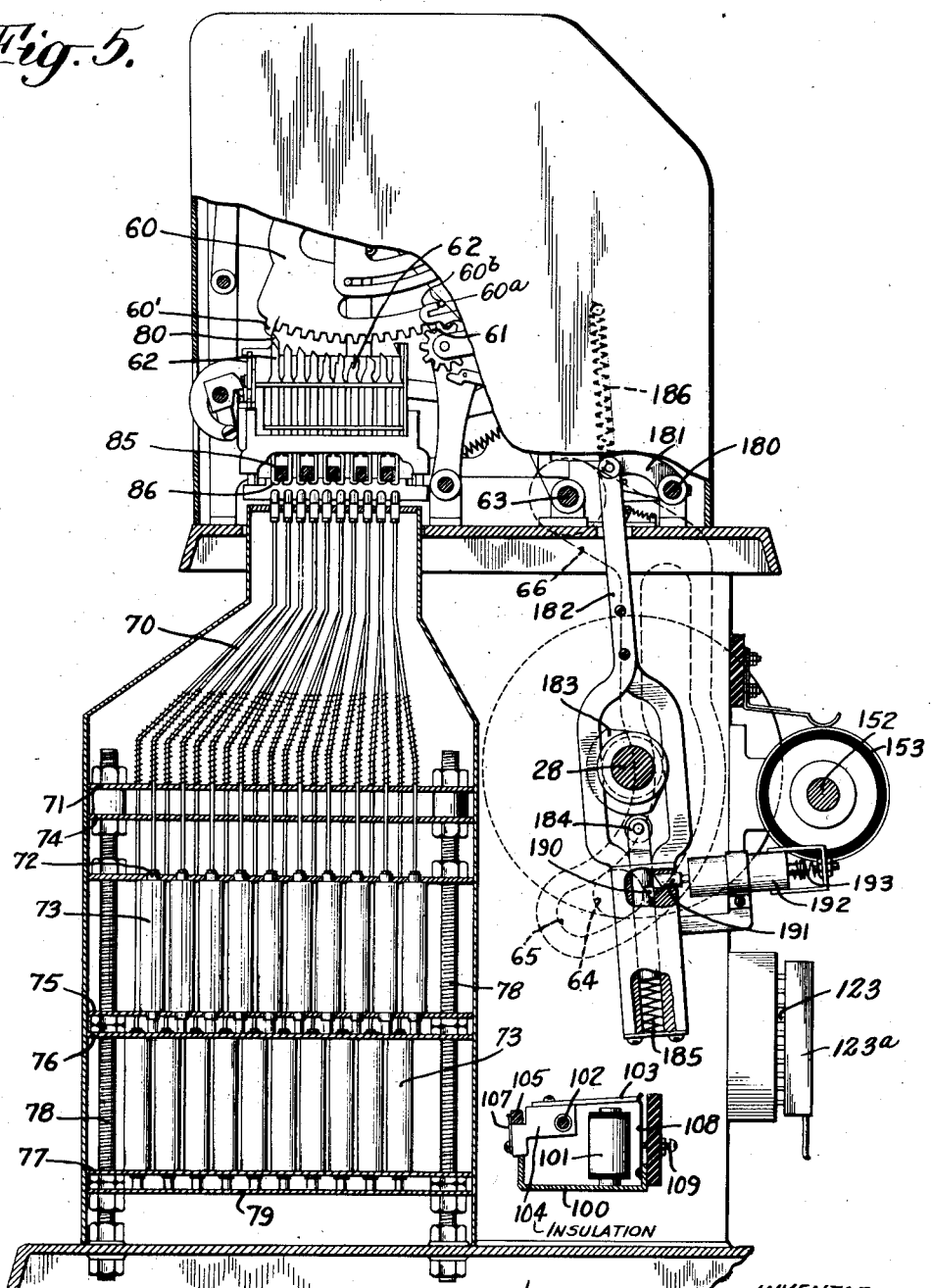

Oct. 30, 1934.  C. A. TRIPP  1,978,919
CARD TABULATING MACHINE
Filed March 28, 1931  9 Sheets-Sheet 6
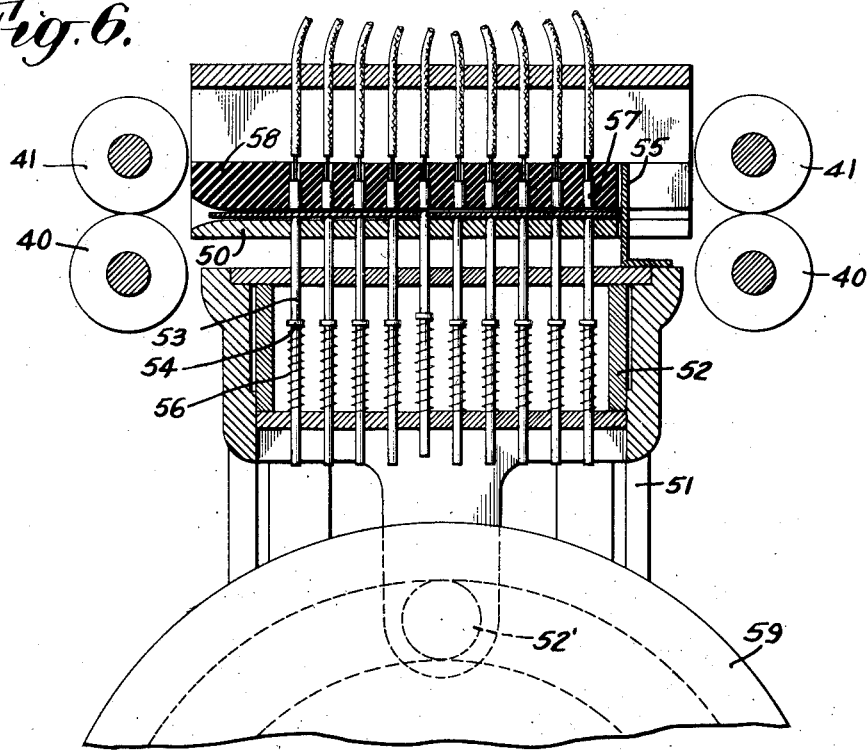
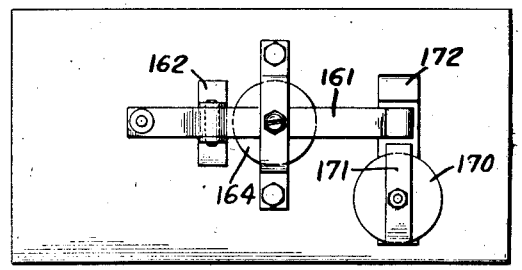
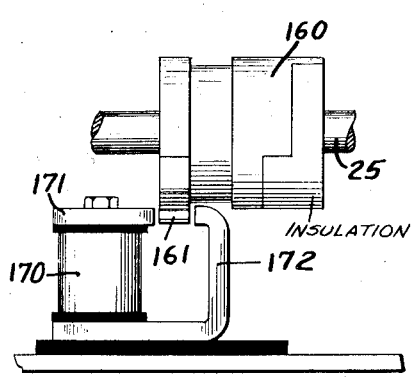
INVENTOR.
CHARLES A. TRIPP, DECEASED,
BY WILMINGTON TRUST COMPANY
& ELIZABETH W. TRIPP, EXECUTORS
By Attorney Oct. 30, 1934.  C. A. TRIPP  1,978,919
CARD TABULATING MACHINE
Filed March 28, 1931   9 Sheets-Sheet 7

INVENTOR.
CHARLES A. TRIPP, DECEASED,
BY WILMINGTON TRUST
COMPANY &
ELIZABETH W. TRIPP,
EXECUTORS.

By Attorney
A. C. Maby

Oct. 30, 1934.　　　　C. A. TRIPP　　　　1,978,919
CARD TABULATING MACHINE
Filed March 28, 1931　　9 Sheets-Sheet 8
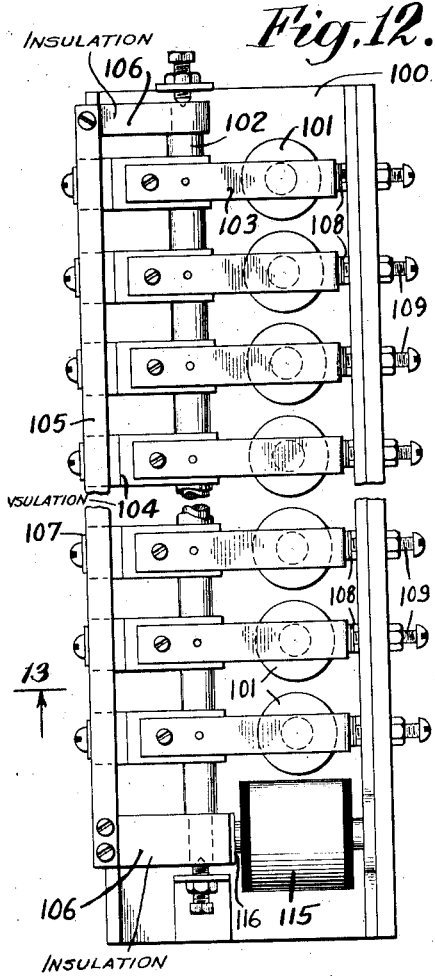
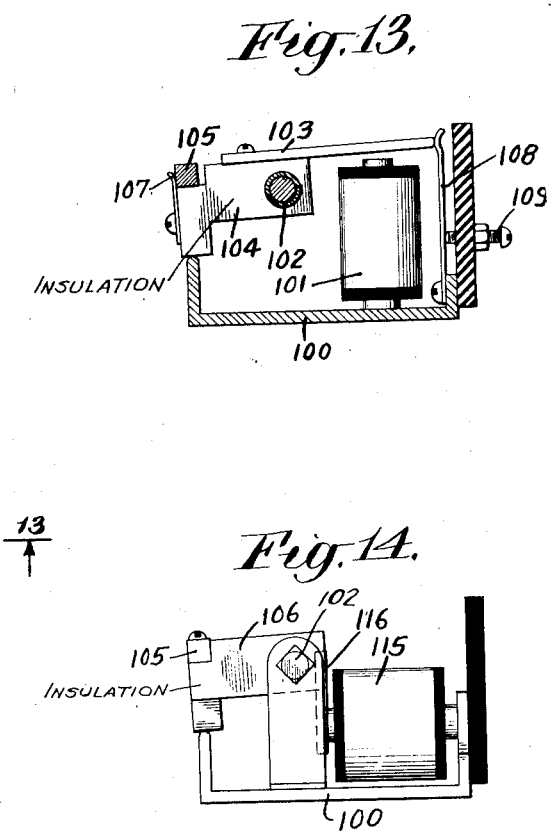
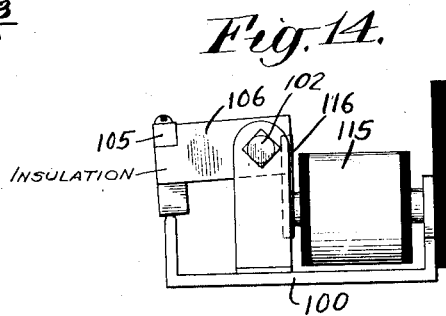
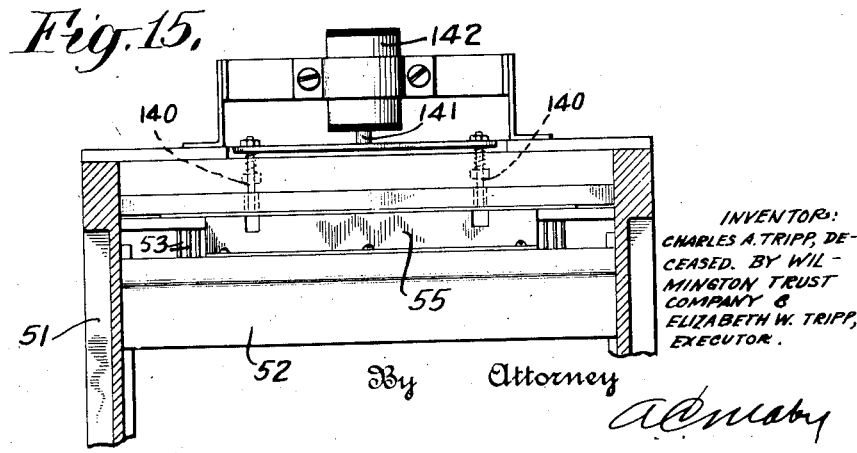
INVENTOR:
CHARLES A. TRIPP, DE-
CEASED. BY WIL-
MINGTON TRUST
COMPANY &
ELIZABETH W. TRIPP,
EXECUTOR.
By　Attorney Patented Oct. 30, 1934

1,978,919

UNITED STATES PATENT OFFICE 1,978,919

CARD TABULATING MACHINE

Charles A. Tripp, deceased, late of Wilmington, Del., by Wilmington Trust Company and Elizabeth W. Tripp, executors, Wilmington, Del., assignors, by mesne assignments, to International Business Machines Corporation, New York, N. Y., a corporation of New York Application March 28, 1931, Serial No. 526,095

3 Claims. (Cl. 235—92)

This invention is concerned with accounting machines of the type controlled by punched cards. Each of the cards used in connection with such machines is provided with punched holes the locations of which on the card denote the different characteristics of the particular items of which a record is kept on that card. Some of such holes are group-designating holes and indicate the group, series, or class to which the card belongs while other holes denote the value of items with which the record represented by such card is concerned.

Prior to their presentation to the accounting machine, these cards are sorted so that all cards of one group, series, or class are brought together. The cards so sorted are successively passed through the accounting machine which records and usually accumulates the items denoted by the holes on each card. When the first card of a new group or series enters the machine, the feeding of cards is interrupted, and the machine is caused to perform some operation, usually a total-taking operation, before the feeding of cards is resumed. Machines operating in the manner above set forth are well known.

The invention is primarily concerned with such machines which are operated and controlled by electrical circuits completed through the holes in the punched cards. Among the objects of the invention are to provide a new and improved means for interrupting the card feed when the first card of a new group or series enters the machine; to provide a new and improved means for causing the accounting machine to take a total between the groups or series of cards; and to provide a new arrangement of solenoids for operating the stops of the accounting machine, by which arrangement considerable space is saved.

Figure 9:
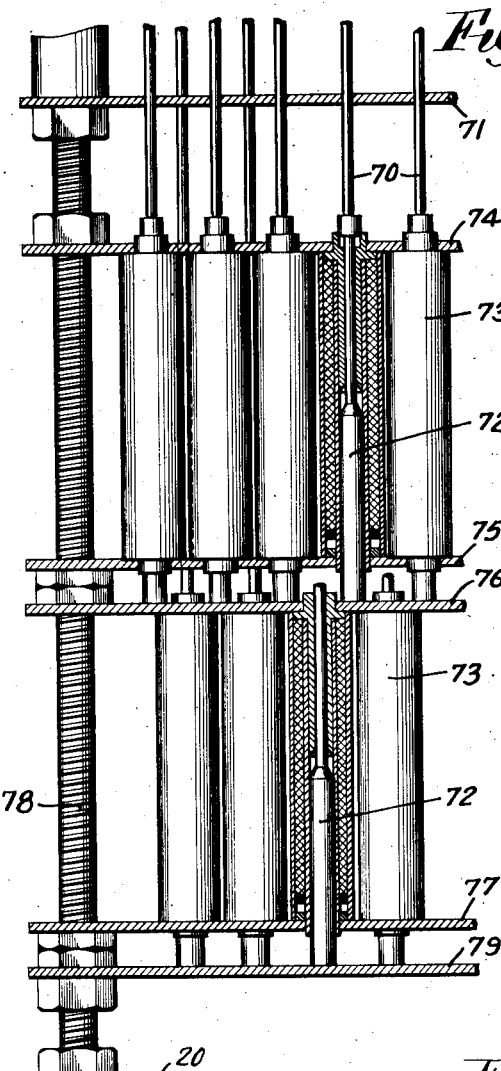
Figure 10:
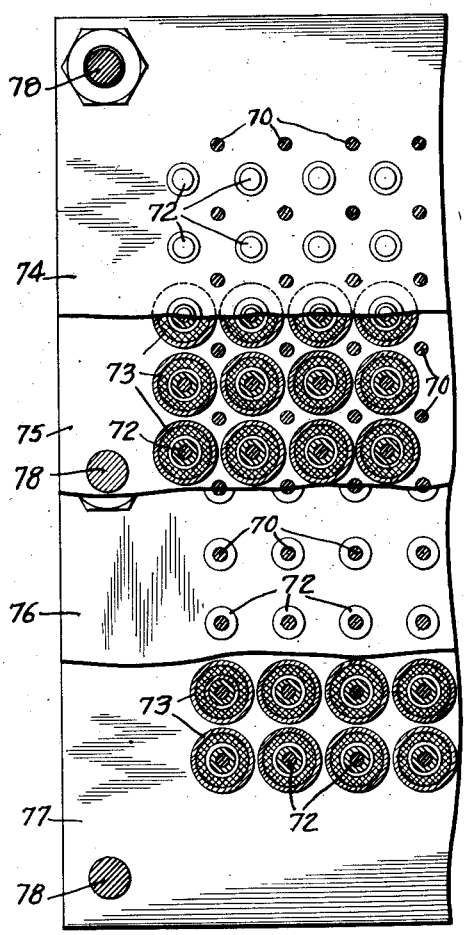
Figure 11:
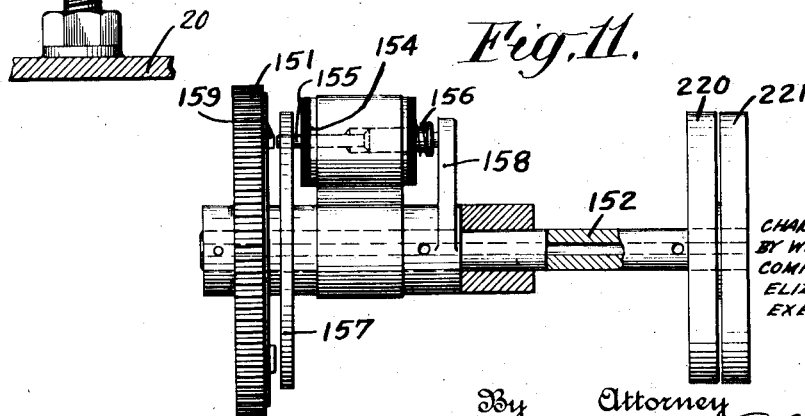
Figure 16:
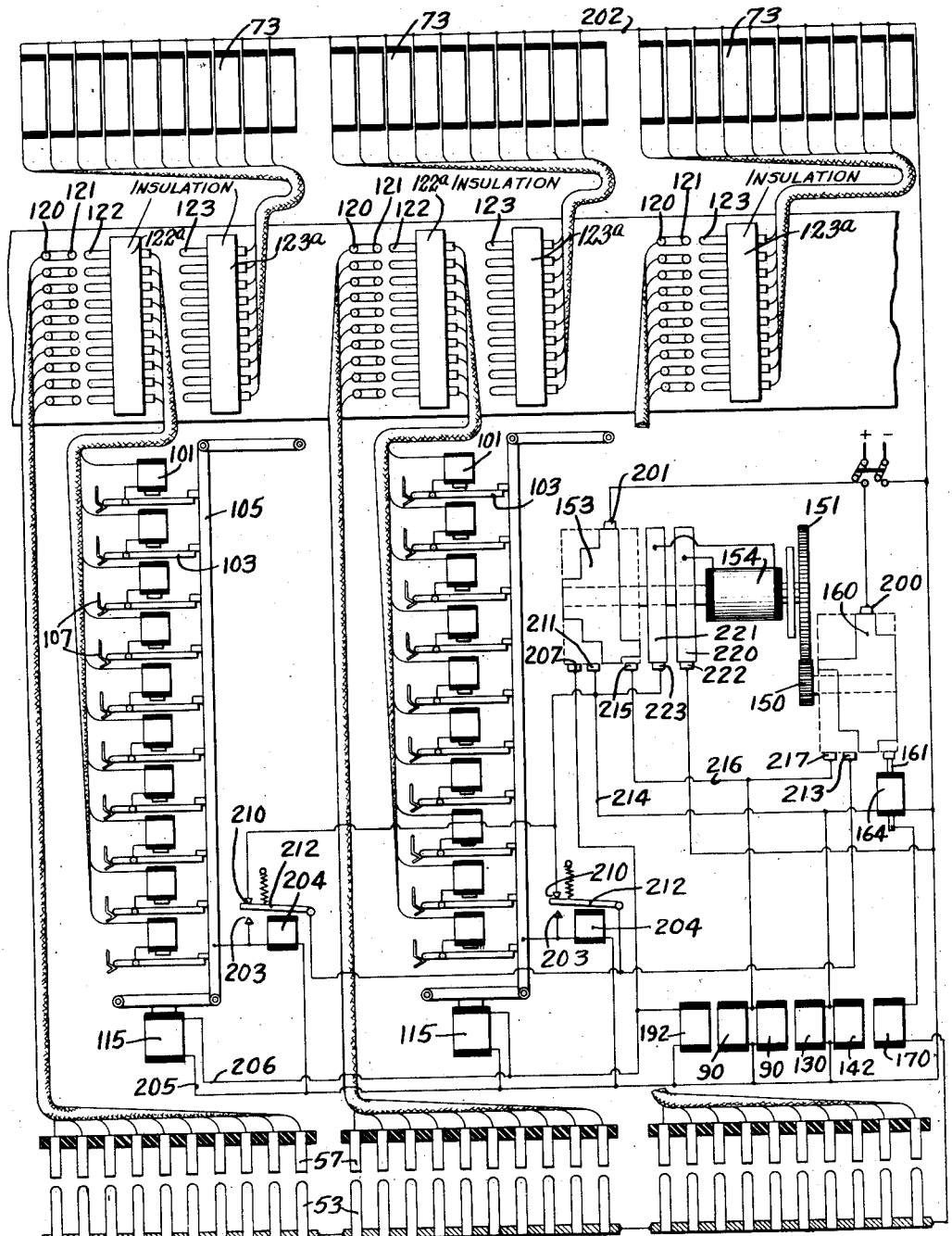

The accompanying drawings illustrate the invention: Fig. 1 is a plan view of a machine embodying the invention; Figs. 2, 3, 4, and 5 are vertical sections respectively on the correspondingly numbered section-lines of Fig. 1; Fig. 6 is a vertical section on a slightly enlarged scale illustrating the construction of the pin box and its associated parts; Fig. 7 is a plan view of the brush and its associated blow-out magnet; Fig. 8 is an end elevation of the parts shown in Fig. 7; Fig. 9 is an elevation in partial section of the stop-actuating solenoids; Fig. 10 is a plan view of the construction illustrated in Fig. 9 with parts of such construction broken away at different levels; Fig. 11 is a detailed view of the totaling clutch; Fig. 12 is a plan view of a selector; Fig. 13 is a vertical section on the line 13—13 of Fig. 12; Fig. 14 in an end elevation of the selector; Fig. 15 is a view illustrating in elevation the card-stopping mechanism; and Fig. 16 is a diagrammatic illustration of the electrical connections between the various parts of the machine.

The machine illustrated in the accompanying drawings may for convenience be considered as consisting of two sections. That section of the machine lying to the right of section-line 4—4 of Fig. 1 is a card-feeding and card-sensing device through which are passed cards containing items and designations which are to be recorded by the recording and totalizing device, which is that portion of the machine lying to the left of the section line 4—4 of Fig. 1.

The two sections of the machine are conveniently mounted on a frame 20, and the moving parts of both machine sections may be operatively interconnected in order that a common source of power may be employed. As shown in the drawings, the source of power consists of an electric motor 21 which, through a belt 22, drives a worm 23 associated with a worm wheel 24. The worm wheel 24 is rigid with a main shaft 25 which extends through and beyond the card-sensing device of the machine and at its end is provided with a gear 26 which meshes with a gear 27 carried by the operating shaft 28 of the recording and totalizing device.

Figure 2:
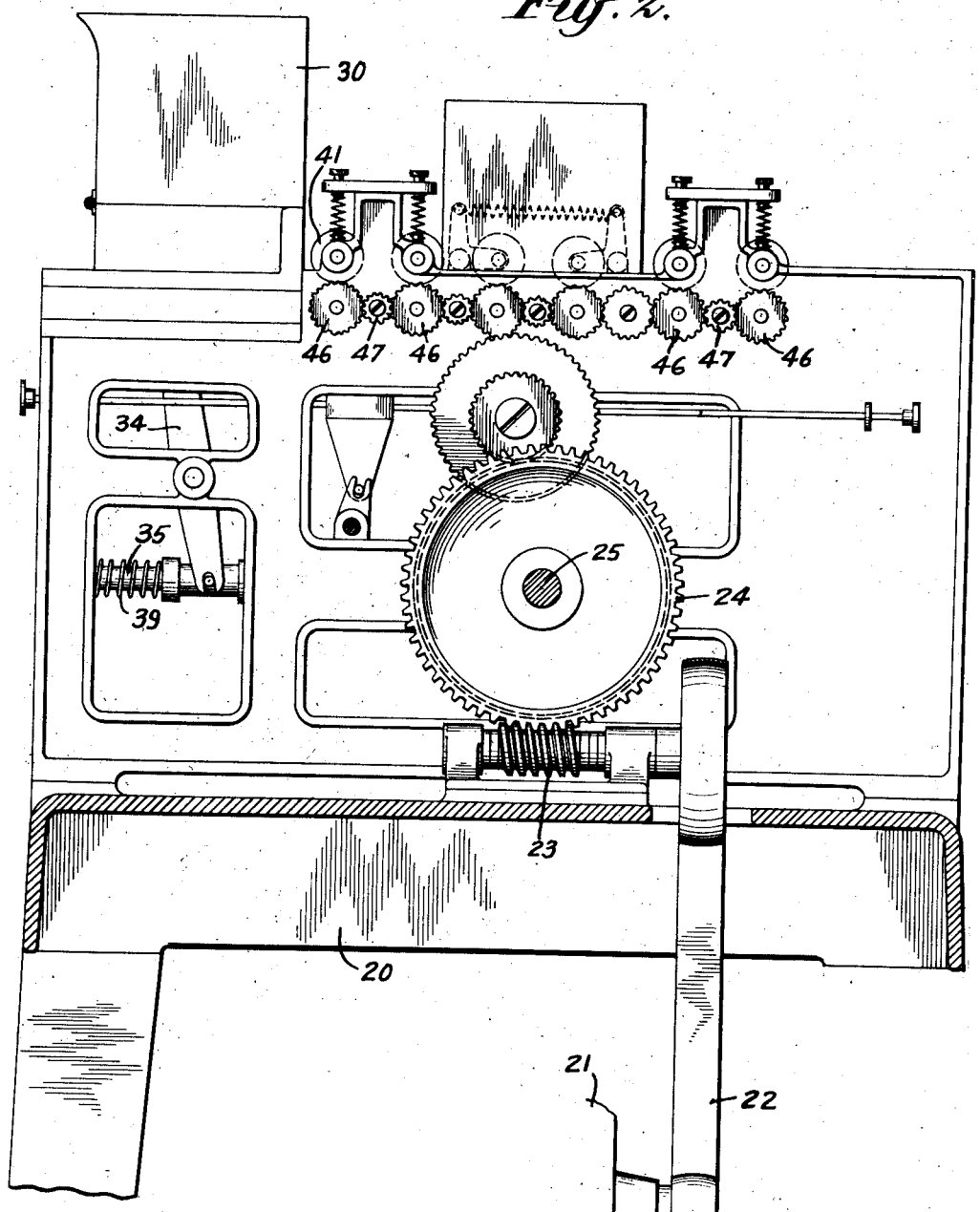
Figure 3:
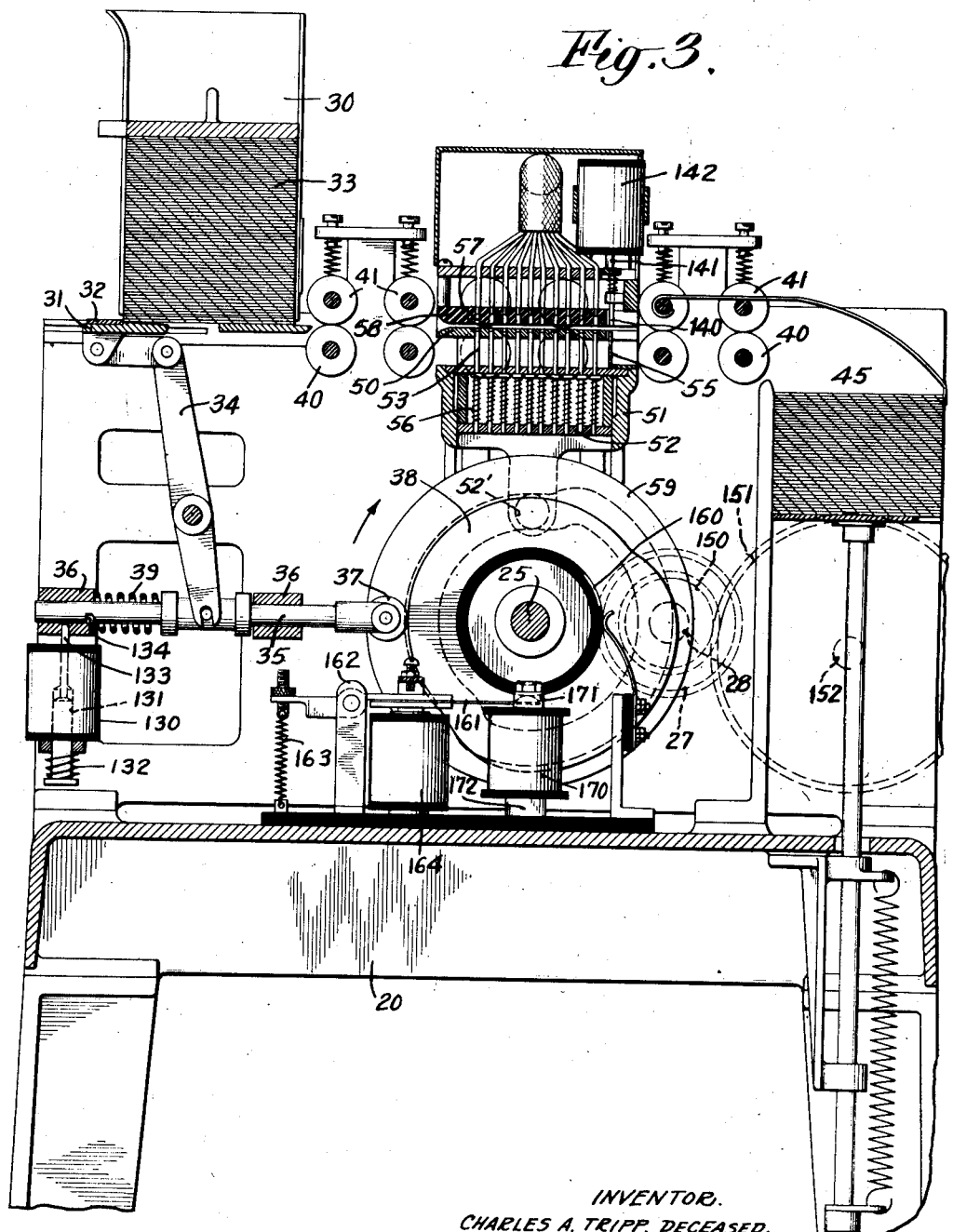
Figure 4:
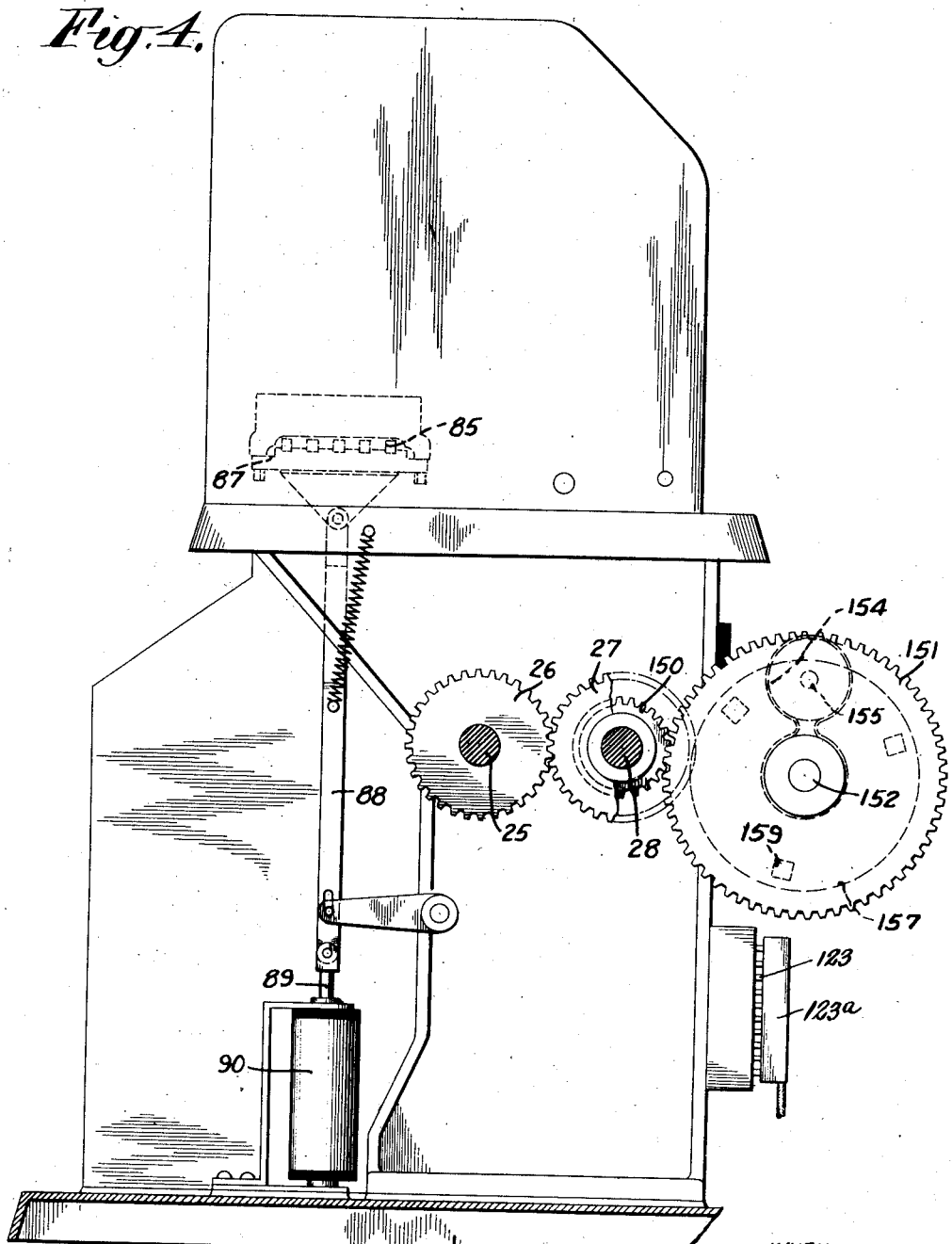

The cards to be fed through the sensing mechanism are stacked in a hopper 30 shown at the left in Figs. 2 and 3. Slidably mounted below the hopper 30 is a picker plate 31 provided with an upwardly projecting shoulder 32 of sufficient height to engage the lower one of a stack of cards 33 in the hopper 30. The picker plate 31 is adapted to be reciprocated, and for this purpose it is link-connected to the upper end of a lever 34, the lower end of which is connected to a slidable rod 35. The rod 35 is mounted in suitable bearings 36 and is provided at its inner end with a roller 37 which is adapted to engage a cam 38 rigidly mounted on the main shaft 25. A compression spring 39 serves normally to press the rod 35 toward the cam 38.

As the shaft 25 revolves in the operation of the machine, the cam 38 will cause reciprocation of the rod 35 and picker plate 31, and at each reciprocation of the picker plate the bottom card in the hopper 30 will be moved outward far enough to enter between the first pair of feed rolls 40 and 41. There are a plurality of pairs of such feed rolls, and they extend across the machine from the hopper 30 to a second hopper 45 which is adapted to receive the discharged cards. The lower feed rolls 40 are all rigid respectively with gears 46 which are interconnected by idler gears 47, one of the gears 46 being adapted to be driven from the main shaft 25. Each of the upper rolls 41 is spring-pressed downward into engagement with its associated lower roll 40 in order that it may rotate therewith.

In its passage from the hopper 30 to the hopper 45, each card passes across a sensing plate 50. Below the sensing plate 50 there is mounted in guides 51 a vertically reciprocable pin box in which are mounted a plurality of sensing pins 53. The pins 53 in the pin box 52 are arranged in a plurality of columns corresponding with the arrangement of the holes in the card which is to be sensed. As shown, each column contains ten of the sensing pins 53. In addition to the pins 53 the pin box 52 carries a card-stop 55 which in the reciprocation of the pin box passes upward above the upper surface of the plate 50 and adjacent to the discharge side thereof. When in raised position above the plate 50 the card-stop 55 prevents the discharge of the card from the plate 50, during which period the rolls 40 which then engage the card slip on the face of the card and do not become effective to move the card off the plate 50 until the card-stop 55 is retracted in the descent of the pin box.

The pin box 52 may be reciprocated by any suitable means. One convenient arrangement is shown in the drawings (Figs. 3 and 6) where the pin box 52 is provided with a roller 52' received in a cam slot in a cam 59 carried by the shaft 25.

Each of the pins 53 is spring-pressed upward by a suitable spring 56, the upward movement of the pins 53 under the influence of the springs 56 being limited by stops 54 which are adapted to engage the top of the pin box. As the pin box rises, the pins 53 enter correspondingly located holes in the plate 50 and engage the card which is then on such plate. Those of the pins 53 which are alined with holes in the card pass through the card and engage suitable contacts 57 which are mounted in a block of insulating material 58. The contacts 57 are located to correspond to the pins 53 in order that any pin passing through a hole in the card will engage one of such contacts.

The passing of the pins 53 through holes in the card on the plate 50 makes possible the completion of electrical circuits which are employed to control the operation of the recording and totaling mechanism. This recording and totaling mechanism, in the machine illustrated in the drawings, is of the type employed in the commercial Powers tabulating machine. As the construction and operation of this machine is well known, it will not be necessary to describe it in great detail. In brief, it consists of swinging sectors 60 (Fig. 5) adapted to mesh with the usual accumulator wheels 61. During each of the usual recording cycles of the machine, the sectors 60 swing through an arc the extent of which is limited by stops 62 and thus cause a definite rotation of the accumulator wheels 61. The sectors 60 are swung back and forth once during each cycle of the machine, such swinging being accomplished by well known mechanism including a rock shaft 63 which is rocked by the co-operation of a pin 64 with the sides of a curved slot 65 in a lever 66 which is rigid with the rock shaft 63. The pin 64 is eccentrically mounted relatively to and rotates with the operating shaft 28 which is connected by the 1—1 gearing 26—27 with the main shaft 25 of the sensing mechanism.

The stops 62 are adapted to be operated respectively by push rods 70 which extend downward from below the lower ends of the stops 62 and are supported and guided by passing through holes in one or more plates 71. The push rods 70 extend through the plates 71 and co-operate with the upper ends of the slidable cores 72 of solenoids or stop setting magnets 73, the circuits of which are controlled by the contacts which are made when pins 53 pass through holes in the card on the sensing plate 50 and engage the contacts 57.

The construction and arrangement of the solenoid 73 will be evident from Figs. 9 and 10. Alternate columns of solenoids are supported between plates 74 and 75 above the remaining columns of solenoids which are supported between plates 76 and 77. The plates 71, 74, 76, and 77 are all supported by legs 78 which may be attached to the frame 20 of the machine. The lower ends of alternate push rods 70 rest on the upper ends of the cores 72 of the upper series of solenoids 73, while the remaining push rods 70 extend downward through the plates 74 and 75 where their lower ends co-operate with the ends of the cores 72 of the lower series of solenoids 73. When retracted, the lower ends of the cores 72 of the upper series of solenoids may rest on the plate 76, a similar plate 79 being provided to limit the downward movement of the cores of the lower series of the solenoids. This arrangement of the solenoids in two series or banks one above the other, solenoids in one bank being staggered relatively to those in the other bank, makes possible the conservation of space in a horizontal plane as will be evident from the fragmental plan view, Fig. 10.

In the adding machine mechanism, there is associated with each of the sectors 60 a zero stop 80 in addition to the ten stops 62 which are associated with each sector 60 and which are adapted to be set by energization of the solenoids 73 as hereinafter explained. The zero stop 80 is in position to engage and limit the movement of its associated sector 60 only when none of the associated stops 62 are raised. Suitable mechanism of a well-known type, is provided for deflecting the zero stop 80 whenever any one of the stops 62 associated therewith is raised.

The operation of the adding machine mechanism shown in the drawings is well-known. After the stops 62 are set in accordance with the position of the holes in the card on the sensing plate 50, the rock shaft 63 is rocked to allow the sectors 60 to move forward (to the right in Fig. 5) until the abutment 60' has engaged that one of the stops 62 which has been raised into its path. Before the forward movement of the sectors has started, the accumulator wheels 61 are lowered sufficiently to disengage them from the teeth of the sectors 60. While the sectors 60 are in their advanced position with the abutments 60' engaging either digit stops 62 or zero stop 80, the accumulator wheels 61 are elevated into engagement with the sector teeth, and upon rearward movement of the sectors each of the accumulator wheels is rotated through an arc the extent of which depends upon which one of the stops limited the forward movement of the sector 60 associated with such accumulator wheel. The usual "carrying" mechanism is provided so that when a unit is carried to any one of the accumulator wheels 61 the associated sector 60 will be permitted to swing one tooth beyond its zero position to cause such accumulator wheel 61 to rotate an additional distance.

As shown in Fig. 5, the accumulator actuating rack 60 is provided with a pin 60a adapted to be engaged as it moves to the left, by a stop arm 60b. This will stop the sector 60 in zero position. The accumulator wheel 61 of the next lower order than the wheel which is actuated by the particular rack 60 is adapted as it passes from its nine to its zero position to raise the stop member 60b to permit pin 60a to move an additional step to the left. Thus, it will be seen that where the wheel 61 of any order in the accumulator passes from the nine to the zero position, it will set the stop member 60b so that the rack 60 of the next higher order will add an extra unit into the wheel of such higher order. This carry mechanism is common to the Dalton type of adding machine.

Some time after the sectors 60 have started their rearward movement, preferably after such movement is completed, the stops 62 which have been raised to limit the immediately preceding forward movement must be lowered in order to avoid interference with succeeding forward movements of the sectors. To this end, there are provided retracting bars 85 which extend through the whole field of stops 62 and engage abutments 86 on such stops so that the retracting bars 85 may be lowered to retract the stops. The retracting bars, at their ends, are connected to yokes 87 (Fig. 4) to each of which is attached a downwardly extending link 88 which at its lower end is connected to the vertically slidable core 89 of a solenoid 90. Upon energization of the solenoids 90, their respective cores, the links 88, and retracting bars 85 are drawn downward to retract all stops 62 which have previously been set.

The operation of the machine will be set forth in detail later, but it is believed that sufficient mechanism has been described to make it evident that as the cards pass from the hopper 30 across the sensing plate the various items appearing on the cards will be recorded by and added into the adding mechanism. The machine operates in this manner so long as the cards which pass across the sensing plate are all of the same group designation. When a card of a new group comes on the plate, it is usually desirable to interrupt the card feed and to cause the adding mechanism to print a total or perform some other operation different from that which occurs as long as the cards passing across the sensing plate are all of the same group.

To detect the presence on the plate 50 of a card having a new group designation, to interrupt the card feed, and to cause the desired operation of the adding mechanism, there is employed a selector which has been described in the prior Patent Number 1,208,051. This selector mechanism is shown in detail in Figs. 12, 13, and 14. It comprises a base 100 on which are mounted a series of electro-magnets 101 corresponding in number to the number of pins 53 in each of the columns of pins in the pin box 52. As shown here, each selector unit includes ten of the magnets 101.

Extending longitudinally of the base 100 is a rod 102 from which are supported armatures 103 for the various magnets 101, such armatures being separately rotatable on the rod 102. Preferably, the armatures 103 are rigidly mounted on blocks of insulating material 104 which are independently rotatable on the rod 102. Each of the blocks 104, at its rear upper corner, is notched for the reception of a rod 105 which extends longitudinally of the selector unit and at its ends is mounted on arms 106 which are rigidly attached to the rod 102. Secured to the rear side of each of the blocks 104 is an electrical contact finger 107 which is adapted to engage the bar 105 when such bar is seated in the notch of the block 104.

When any one of the armatures 103 is drawn downward by its associated magnet 101, it will be evident that the bar 105 will be raised out of engagement with all of the contact fingers 107 except the contact finger that is carried by the block 104 which raised the bar 105. To prevent accidental lowering of the armatures which are not acted upon by their associated magnets, and to tend to retain in depressed position any armature which has been drawn downward by its associated magnet, each armature engages a leaf spring 108 of the form shown in Fig. 13. Desirably, each of the springs 108 is adjustable by means of an adjusting screw 109.

For the purpose of re-setting the selector unit, there is provided a re-setting magnet 115 which has an armature 116 rigid with the rod 102. Upon energization of the re-setting magnet 115, the armature 116 is drawn to the right (Fig. 14) to cause a counter-clockwise rotation of the rod 102 and the arms 106. This rotation of the rod 102 lowers the bar 105 and raises any of the armatures 103 which have previously been depressed.

There is illustrated in the drawings means for connecting any column of stop-actuating solenoids 73 with any of the columns of contacts 57 in the insulating block 58, and there is also illustrated means for connecting any of such columns of contacts with any of the selector units. Such means consists of the plugs and jacks illustrated in Fig. 16. In this figure, each of the contacts 57 is connected to jacks 120 and 121 which are arranged in pairs of columns each pair of which correspond to one column of the contacts 57.

To co-operate with the jacks 120 and 121, there is provided gang contact plugs 122 mounted in a common block 122a each individual plug of which is connected to one end of the winding of one of the magnets 101 of a selector, and there is also provided gang contact plugs 123 mounted in a common block 123a each individual plug of which is connected to one end of the winding of one of the stop-actuating solenoids 73. This arrangement makes possible the connecting of any column of contacts 57 with any selector unit and with any column of solenoids 73.

In the operation of the machine, the selector units, by a process which will be described in detail later, detect any difference in the punchings of the columns whose corresponding contacts 57 are connected to selector units and cause an interruption of the card feed and the taking of the total by the adding mechanism. This operation occurs when a card of a new group passes onto the plate 50 and is sensed. As this new card belongs to the new group, it is necessary that its data shall not be added at that time and that it be retained on the plate in order that it may be re-sensed after the total operation so that the items that it contains may be recorded and added into the adding mechanism.

To interrupt the feeding of cards from the hopper when a card of a new group is sensed on the plate 50 there is provided a solenoid 130 (Fig. 3) the core 131 of which may be moved against the pressure of a spring 132 to cause the core-end 133 to enter a notch 134 in the reciprocating rod 35 and to hold such rod in retracted position with the roller 37 temporarily out of engagement with the cam 38. With the rod 35 thus retracted, the cam 38 can rotate with the shaft 25 without causing the feeding of any cards from the hopper 30.

To retain on the sensing plate 50 the first card of a new group, there is provided an auxiliary card stop which may conveniently take the form of one or more pins 140 operatively connected to the core 141 of a card-stop solenoid 142. Normally, the pins 140 are spring-pressed upward so as not to interfere with the passage of cards off the plate 50; but upon energization of the solenoid 142, the pins 140 are lowered sufficiently to prevent the discharge of a card from the plate 50. The card stop 55 is provided with notches which are in alinement with the pins 140 in order that the pin box may reciprocate freely when the stop pins 140 are depressed.

The cessation of the card feed may continue for any desired number of revolutions of the shaft 25. It is found convenient to interrupt the card feed for three complete revolutions of the shaft 25, and the machine shown in the drawings is adapted to accomplish this result. To this end, there is provided mating 1—3 gears 150 and 151, the smaller of which (the gear 150) is rigidly mounted on some shaft which rotates once during each revolution of the main shaft 25. Conveniently, the gear 150, is mounted on the shaft 28. The gear 151 is rotatably mounted on a totaling shaft 152 which carries a totaling commutator 153 (Figs. 1 and 5) arranged to control the operations which occur while the card feed is interrupted.

To connect the gear 151 to the shaft 152 there is mounted rigidly on the shaft 152 a solenoid or totaling clutch magnet 154 having a slidable core 155 (Fig. 11), such core being normally spring-pressed in a direction away from the gear 151 as by means of a spring 156. The front end of the slidable core 155 is conveniently guided by passing through a hole in a plate 157 which rotates with the shaft 152. The rear end of the core 155, when such core is moved to the rear under the action of the spring 156, co-operates with a stationary stop 158 which prevents overthrow rotation of the shaft 152. The opposite end of the core 155 is adapted to co-operate with any one of a series of teeth 159 which are mounted on the rear face of the rotating gear 151. When the solenoid 154 is energized, the core 155 is moved forward (to the left in Fig. 11) in position to be engaged by one of the teeth 159, and when such engagement occurs, the shaft 152 rotates with the gear 151.

In addition to the totaling commutator 153, there is provided a second commutator 160 which is arranged to rotate at the same rate as the main shaft 25, and is conveniently mounted on such main shaft as is clear from Figs. 3 and 8. Cooperating with the commutator 160 is a movable brush 161 which is conveniently pivotally mounted in a support 162 and is spring-pressed into engagement with the commutator 160 by the coil spring 163. The brush 161 forms an armature which is arranged to co-operate with a magnet 164, such magnet when energized serving to withdraw the brush 161 from contact with the commutator 160.

To prevent arcing upon separation of the brush 151 from the commutator 160, there is provided a blow-out magnet 170 the core of which is provided with extensions 171 and 172 to form a magnetic field across the point of separation of brush and commutator when such separation occurs.

In taking a total with the adding mechanism shown in the drawings, it is necessary before the sectors 60 begin their forward movement in the totaling cycle to perform an operation which will keep the accumulator wheels 61 in engagement with the teeth 60 during the forward movement of such sectors instead of withdrawing the accumulator wheels from engagement with the sectors 60 before the forward movement thereof as occurs in the normal recording cycle. It is also necessary before the sectors swing forward in the totalling cycle to deflect the zero stops 80 so that the extent of movement of the sectors will be determined by the accumulator wheels (see United States Patent #1,236,481). The mechanism which accomplishes these results is well-known and need not be described in detail here. Such mechanism includes a shaft 180 which, when rocked in a counter-clockwise direction (Fig. 5), deflects the zero stops and prevents separation of the accumulator wheels 61 and the sectors 60 upon the immediately following forward movement of the sectors.

To provide for this rocking of the shaft 180, there is mounted on it an arm 181 the end of which is connected to a link 182. The link 182 extends downward and is bifurcated to straddle the shaft 28. The shaft 28 carries a totaling cam 183 which co-operates with a cam-follower 184 slidably mounted in the lower end of the link 182. A spring 185 acts on the cam follower 184 to hold it in engagement with the cam 183; but the spring 185 is weaker than is a spring 186 which acts on the shaft 180 tending to rotate it in a clockwise direction (Fig. 5). Since the spring 185 is weaker than the spring 186, the cam follower 184 normally reciprocates in the link 182 during the rotation of the cam 183 without causing any movement of the totaling shaft 180.

When it is desired to take a total, it will be evident that the totaling shaft 180 may be rocked by cam 183 against the force of the spring 186 if relative movement of the cam follower 184 and the link 182 is prevented. This result may be accomplished by providing the cam follower 184 with a notch 190 which co-operates with a latch 191 arranged to be operated by a solenoid 192 mounted on the link 182. A spring 193 serves normally to hold the latch 191 out of engagement with the notch 190; but upon energization of the solenoid 192, the latch 191 is moved inward to engage the notch 190 and thus to prevent downward movement of the cam follower 184 relative to the link 182. With the cam follower and the link thus locked together, the link 182 will be lowered to rock the totaling shaft when the lobe of the cam 183 engages the cam follower 184.

The general arrangement of electrical connections is illustrated in Fig. 16. One side of the supply circuit, here shown as the positive side, is connected to brushes 200 and 201 which contact respectively with the commutators 160 and 153. The brush 161 which co-operates with commutator 160 is connected through the blowout magnet 170 with all the pins 53 in the pin box 52. As above described, the contacts 57 which co-operate with the pins 53 are connected to the jacks 120 and 121 and the gang contact 130 plugs 123 which are received in such jacks are connected respectively to the windings of the solenoids 73 in one column. The other ends of the windings of such solenoids are connected to a bus wire 202 which leads to the negative side of the supply circuit.

As has been described above, each of the individual plugs 122 is connected to one end of the winding of one of the selector magnets 101. The other end of the winding of each selector magnet is connected to the corresponding contact finger 107, and the bar 105 with which such fingers 107 contact is connected to one contact 203 of a relay 204. One end of the winding of the relay 204 is connected to the contact 203 and the other end is connected to a bus wire 205 which joins one end of the winding of the re-set magnets 115. The bus wire 205 is connected to the negative side of the supply circuit. The other ends of the windings of the re-set magnets 115 are all connected to a bus wire 206 which leads to a brush 207 co-operating with the totaling commutator 153. In addition to the contacts 203, each of the relays 204 has a second contact 210, such contacts 210 all being connected together and to a brush 211 which also co-operates with the totaling commutator 153. The armatures 212 of the relays 204 are all electrically connected together and to a brush 213 which co-operates with the commutator 160. Connected to the brush 211 is a wire 214 which has two branches, one of which leads through the brush-lifting magnet 164 and the other of which leads through the feed-stop magnet 130 and the card-retaining magnet 142 to the bus wire 205, the windings 130 and 142 preferably being arranged in multiple. A brush 215 which co-operates with the totaling commutator 153 is connected by a wire 216 with a brush 217 co-operating with the commutator 160 and the wire 216 is connected through the re-set magnets 90 to the negative bus wire 205, the re-set magnets 90 being connected in multiple.

The ends of the windings of the clutch-actuating solenoid 154 are connected respectively to two collector rings 220 and 221 which are mounted on the shaft 152. Co-operating with the collector ring 220 is a brush 222 which is connected to the negative bus wire 205. A brush 223 co-operates with the collector ring 221 and is connected to a wire joining the contacts 210 of the relays 204. The total-setting magnet 192 is connected between the bus wires 205 and 206.

In setting up a machine for a run of cards, those contacts 57 which correspond to group-designating columns or fields of columns in the punched card are connected by means of plugs 122 and jacks 120 with selector units; and, if it is desired to print the numbers of the designating columns, such contacts 57 are connected by means of the plugs 123 and the jacks 121 with columns of solenoids 73 which control the stops 62 of the adding mechanism. Those columns of contacts 57 which correspond to item-designating columns or fields of columns in the punched card are connected by means of the plugs 123 and the jacks 121 with columns of solenoids 73 which control the stops 62 of the adding mechanism. In Fig. 16, the parts are shown in the positions which they assume when the pin box is rising or is about to rise to sense the first card of a new group. In this situation, the sectors 60 of the adding mechanism are all in their normal zero positions as are also the accumulator wheels 61. In each selector unit, the bar 105 is depressed and is in contact with all the contact fingers 107. The totaling clutch magnet 154 is de-energized and its core is in engagement with the stop 158 to hold the totaling shaft 152 stationary. The brushes 200 and 201 which supply the current respectively to the commutators 160 and 153 are in contact with such commutators but no other brush is in contact with either commutator. The brush-lifting magnet 164 is de-energized and the spring 163 holds the brush 161 in position to engage the commutator segment.

The operation of the machine is as follows: During each recording cycle, the bottom card 33 is fed from the hopper 30 to the feed rolls 40 and 41 and is thereby carried onto the sensing plate 50. The pin box 52 rises and carries the card stop 55 into the path of the card which is on the plate 50, such card being held against the card stop 55 by the rotation of the feed rolls 40 which slip on the under surface of the card. As the pin box continues to rise, those pins 53 which are in alinement with holes in the card pass through and engage the corresponding contacts 57. This engagement of the pins 53 with the contacts 57 does not immediately complete any electrical circuit, but makes possible the later completion of two circuits when the commutator 160 engages the brush 161. When this occurs, a current flows from the positive side of the supply circuit, through the commutator 160, brush 161, blow-out magnet 170, pins 53, and contacts 57 to the jacks 120 and 121. From the jacks, part of the current flows to the bus wire 202 through the solenoids 73 which correspond to these pins 53 which have found holes in the card and the remainder of the current flows through one of the selector magnets 101 in each operative selector unit, the contact finger 107 associated with such magnet, the bar 105, and relay 204, to the negative bus wire 205. The energization of any of the selector magnets 101 causes the armature 103 associated therewith to move downward and to separate the bar 105 from all the contact fingers 107 except that contact finger which is associated with the energized selector magnet 101. The energization of the relay 204 causes the completion of a shunt circuit from the positive side of the supply circuit through the commutator 160, brush 213, armature 212, contact 203, and the winding of the relay 204 to the negative bus wire 205.

After the solenoids 73 have been energized to cause setting of stops 62 corresponding to the holes in the cards on the plate 50, the sectors 60 are swung forward and the items on the card are recorded by being printed as in Patent No. 1,236,481, and on the return stroke of the sectors are added into the accumulator wheels 61. After the sectors 60 have begun their rearward movement, the commutator 160 contacts with the brush 217 and completes a circuit through the re-set magnets 90 which operate to draw the retracting bars 85 downward and thus to retract the stops 62 which have previously been set.

When, in the descent of the pin box, the card-stop 55 passes below the surface of the plate 50, the card on such plate is discharged therefrom and into the discharge hopper 45. Subsequently, and before the next rise of the pin box, another card is fed from the hopper 30 onto the plate 50, and the operations described above are repeated.

This sequence of operations continues so long as each card which enters upon the plate 50 has the same designating characteristics as had the card which preceded it. When, however, a card having a different group designation enters upon the plate 50 and is sensed, another series of operations takes place. When the first card of a new group is sensed, at least one of the pins 53 in the columns constituting the designating field, which pin has passed through holes in the preceding cards, will find no hole and will thus be prevented from contacting with its associated contact 57.

Since the selector units have previously been set so that only one of the contact fingers 107 engages the bar 105 in each selector unit, and since upon a change of group designation one of the pins 53 corresponding to a contact finger 107 which was in contact with its respective bar 105 fails to engage its corresponding contact 57, the pin in that column which now finds a hole and engages its corresponding contact corresponds to a contact finger 107 which is not in contact with the bar 105. This failure to make contact between the finger 107 and bar 105 prevents the energization of the relay 204 associated with such selector unit when the commutator segment 160 engages the brush 161, thus leaving the armature 212 of such relay in engagement with the contact 210. When now the segment of commutator 160 engages the brush 213, there will be completed a circuit from the positive side of the supply line through the commutator 160, brush 213, armature 212, contact 210, brush 223, collector ring 221, clutch magnet 154, collector ring 220, and brush 222 to the negative bus wire 205. The resultant energization of the clutch magnet 154 causes the core thereof to become disengaged from the stop 158 and to engage one of the clutch teeth 159 to clutch the gear 151 to the totaling shaft 152, thus starting rotation of the commutator 153. From a junction in the above circuit near the brush 211, a circuit is also completed through the magnet 164 to the negative bus wire 205. The resultant energization of this magnet causes the brush 161 to be withdrawn from contact with the commutator 160, thus preventing the energization of any stop-setting solenoids 73 in the immediately succeeding cycles. From another junction in this circuit near the magnet 164, a circuit is also completed through the magnets 130 and 142 to the negative bus wire 205. The resultant energization of the magnet 130 stops the action of the card feed, through the movement of the core 131 and associated parts, as previously described, and as shown in Fig. 7. The resultant energization of the magnet 142 operates through the movement of its core and attached parts as previously described, and shown in detail in Fig. 15, to hold the first card of the new series on the plate 50 during the totaling cycle.

When the first card of a new group enters upon the plate 50 and is sensed, stops 62 in the adding machine mechanism are set corresponding to the items on this new card. As these items belong to the new group and not to the old group, they should not be included in the total which is to be taken, and it is therefore necessary to retract any stops which have been raised upon the sensing of this new card. This retraction must occur before the sectors 60 begin their forward stroke. To this end, as the commutator 153 starts to revolve, it makes contact with the brush 215 to establish a circuit from the positive side of the line through the commutator 153, brush 215, and re-setting magnets 90 to the negative bus wire 205. The resultant energization of the re-setting magnets 90 retracts the stops 62 which have been set in accordance with the holes in the card on the plate 50.

Following this, the segment of commutator 153 comes into engagement with the brush 211. This engagement of the brush 211 with the commutator 153 has no immediate effect, as the circuits it would complete have already been completed by reason of the engagement of the commutator 160 with the brush 213; but after the commutator 160 has left the brush 213, the engagement of the commutator 153 and brush 211 maintains the energization of the brush-lifting magnet 164 and the card-stop and feed-stop magnets 130 and 142.

Following the retraction of the stops 62 which results from the energization of the re-setting magnets 90, the shaft 63 of the adding mechanism is rocked to bring into engagement with the auxiliary zero stops 80 any of the sectors 60 which have in the previous item-recording cycle swung back beyond their normal position in the "carrying" operation. After the rock shaft 63 has returned to its normal position the totaling commutator 153 comes into engagement with the brush 207 which establishes a circuit from the positive side of the line through the commutator 153, brush 207, and selector re-setting magnets 115 to the negative bus wire 205. The total setting magnet 192, which is connected in multiple with the re-setting magnets 115, is also energized at this time.

Upon the energization of the total setting magnet 192, the cam follower 184 is locked to the link 182 to cause rocking of the total shaft 180. Following the rocking of the total shaft 180, the main shaft 63 of the adding mechanism is rocked to cause the sectors 60 to swing forward to positions determined by the accumulator wheels 61, (see said Patent No. 1,236,481) and a total is then printed. The accumulator wheels 61, which are now all at their zero positions are, in the normal operation of the adding mechanism, now with-drawn from the sectors 60 and such sectors swing back to their normal zero position. During the swinging of the sectors 60, the pin box 52 has risen and pins 53 pass through holes in the card on the plate 50 to engage corresponding contacts 57. This engagement, however, does not complete or result in the completion of any electrical circuits, as the pins 53 are all in circuit through the blow-out magnet 170 with the brush 161 which has been disengaged from the commutator 160 by reason of the energization of the brush-lifting magnet 164, as described above. The total has now been printed and the adding mechanism cleared. The shaft 152, however, is still clutched to the gear 159, and continues to rotate therewith. The commutator 153 is still in engagement with the brush 211, and as a result the magnets 130 and 142 are still operating to interrupt the card feed and to hold on the plate 50 the first card of the new group. As the pin box raises on its next upward stroke, which is the third upward stroke since the first card of the new group has been fed onto the plate 50, certain of the pins 53 find holes in such card, but the engagement of such pins with their corresponding contacts 57 has no effect since the brush 161 is still lifted off the commutator 160. This third upward and downward movement of the pin box 52 produces a spacing of the tape or paper on which the items are recorded and serves to separate the total which has just been printed from the group of items which is to be printed therebelow.

During the next upward stroke of the pin box 52, and after the card stop 55 has projected above the plate 50, the engagement between the commutator 153 and brush 211 is broken. This breaks the circuit through the feed-stop and card-stop magnets 130 and 142 and also de-energizes the brush-lifting magnet 164. The de-energization of the magnet 164 permits the brush 161 to engage the commutator 160 and to establish circuits through the pins 53, contacts 57 and through the selector units and stop-solenoids 73 to the negative side of the supply circuit as above described, with the result that the selector units are set to correspond with the punching in the designating columns of this first card of the new series, and the stops of the adding units set so that the amounts indicated by the punching in the columns connected for adding are printed and put into the accumulators, as the first item of the new series.

Following this, the machine resumes its regular operation on cards of the new series, feeding each card to the sensing mechanism and accumulating the items thereon. This operation continues until the first card of another series passes onto the plate 50, when the card feed will be interrupted and a total taken as above described.

What is claimed as the invention is:—

1. In combination with a record-controlled accounting machine having a total-taking control element adapted when set to cause the machine to take a total, and a normally operating driving member, a link connected to said element to set the same, and electromagnetically operated means controlled by records for coupling said link to said driving member to effect setting of said element.

2. In a perforated record-controlled accounting machine having an accumulating and totalizing mechanism and control means for causing the machine to take a total, the combination of a constantly operating driving member, normally inoperative reciprocable interconnecting means between said control means and the driving member, and electromagnetically operated means controlled by records for coupling said interconnecting means to the driving member to operate said control means.

3. In a device controlled by punched cards, the combination of a control member, means for feeding punched cards successively to said control member, said means including a reciprocable member, a plurality of circuit-closing members cooperating with said control member through punchings in each card fed to said control member, an operating shaft having a cam thereon for actuating said reciprocable member, and electromagnetically operated means controlled by said circuit closing members for locking said reciprocable member out of cooperation with said cam to stop the feeding of cards.

WILMINGTON TRUST COMPANY, [L. S.]
By ELWYN EVANS,
  *Vice President*,
ELIZABETH W. TRIPP,
*Joint Executors of the Estate of Charles A. Tripp, Deceased.*